Feb. 24, 1953 S. J. BAILEY 2,629,490
AUTOMATIC WEIGHING MACHINE
Filed Aug. 15, 1950 2 SHEETS—SHEET 1

INVENTOR
SAMUEL J. BAILEY
BY
ATTORNEYS

Feb. 24, 1953  S. J. BAILEY  2,629,490
AUTOMATIC WEIGHING MACHINE
Filed Aug. 15, 1950  2 SHEETS—SHEET 2
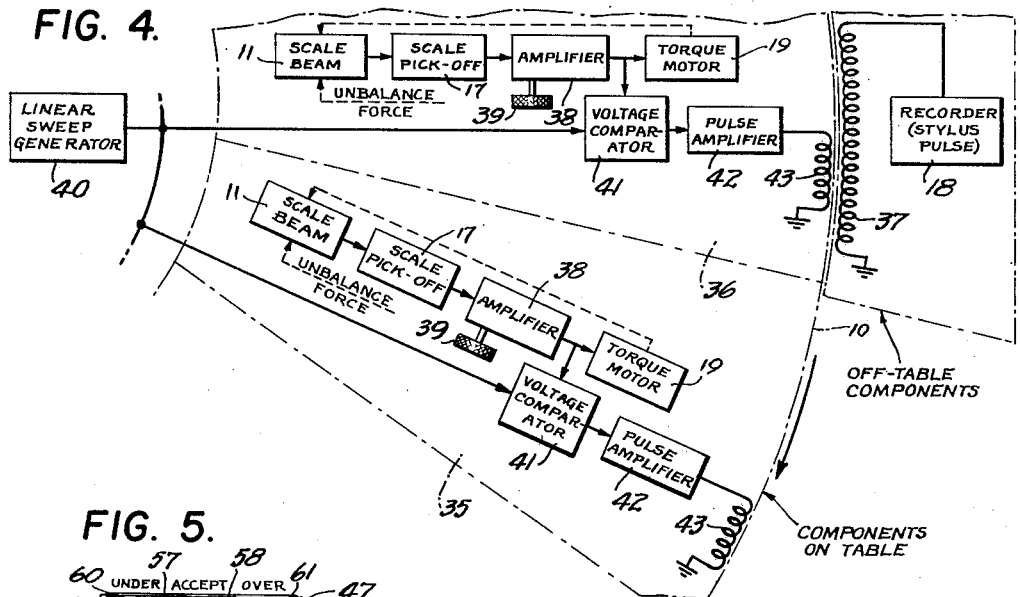
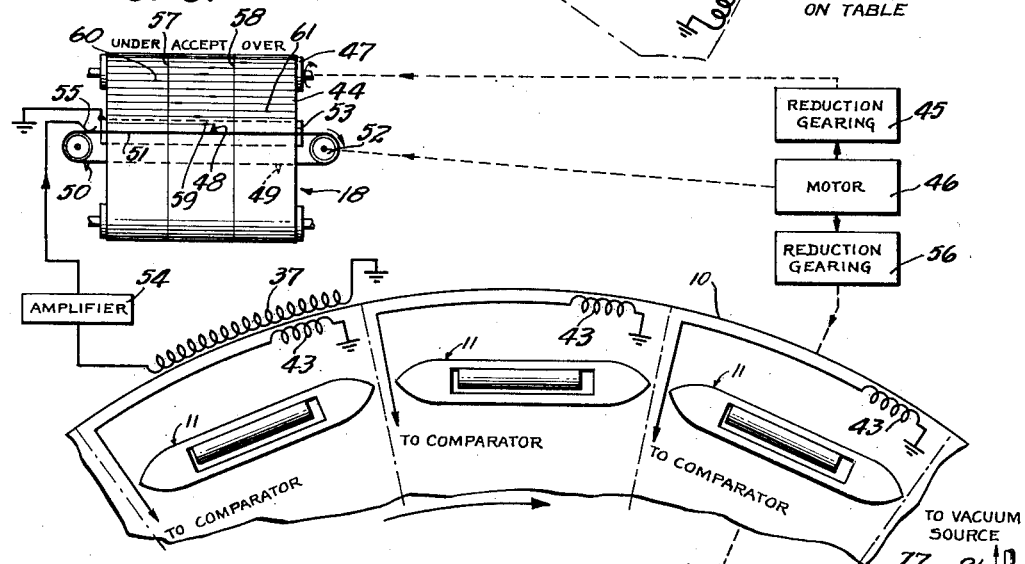
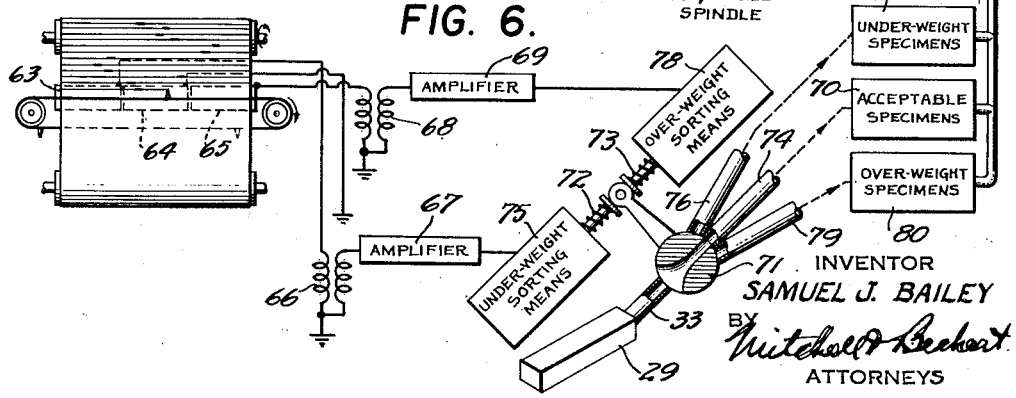
INVENTOR
SAMUEL J. BAILEY
BY
Mitchell & Beckert
ATTORNEYS Patented Feb. 24, 1953

2,629,490

UNITED STATES PATENT OFFICE 2,629,490

AUTOMATIC WEIGHING MACHINE

Samuel J. Bailey, Roosevelt, N. Y., assignor to Servo Corporation of America, New Hyde Park, N. Y., a corporation of New York Application August 15, 1950, Serial No. 179,609

21 Claims. (Cl. 209—121)

My invention relates to an automatic weighing device and in particular to a means for observing the under- or over-weight nature of supposedly uniform specimens produced in a high-speed production line.

In such industries as that of cigarette manufacturing, cartridge-loading and the like, it is desirable to know whether the specimens produced by a high-speed automatic manufacturing process conform to prescribed weight tolerances. For greatest economy of materials (e. g. tobacco, for the case of cigarettes; powder, for the case of cartridges), it is desirable to make the weight tolerances as close as possible, and to be able to determine, during the production-line process and before packaging, whether the specimen-weight is being kept within such close tolerances. In such high-speed production processes, it is also desirable that the weighing operation be performed on every specimen produced, rather than only on selected samples of the manufactured product. It is further desirable that observed weight deviations shall be apparent substantially immediately, so that appropriate corrective measures may be taken with a minimum loss of materials. As far as I know, there has not thus far been a device capable of making individual-weight determinations for every production-line product, and effective without slowing the speed of the production line.

It is, accordingly, an object of my invention to provide improved weighing means of the character indicated.

It is another object to provide an improved high-speed automatic weighing mechanism, with the above-mentioned desirable features.

It is also an object to provide a means for automatically weighing and for recording the weight of the individual products of a high-speed production line, as a part of the continuous production-line process, without slowing the pace of current production.

It is a further object to provide improved automatic weighing means for use in a continuous production line for individually weighing production-line products and for automatically sorting-out products which are not within the weight tolerances.

It is a general object to meet the above objects with a relatively simple arrangement that is easy to use and monitor, and that is readily adaptable to calibration.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 4 is a fragmentary schematic block diagram of the basic electrical components of the machine of Fig. 1;

Fig. 5 is another schematic block diagram, illustrating operation of recording means for the machine of Fig. 1; and Fig. 6 is a simplified schematic representation of a modified arrangement.

Figure 1:
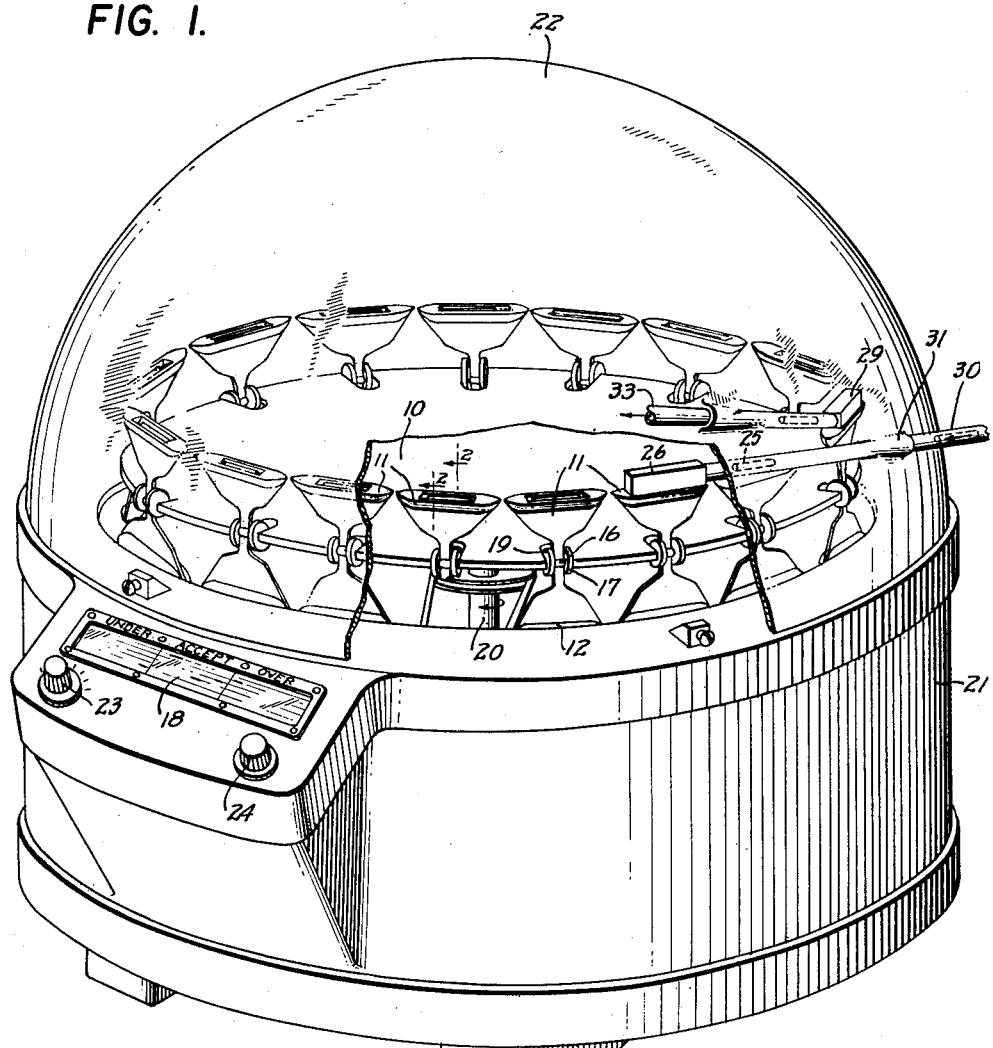
Fig. 1 is a perspective view of an automatic-weighing machine incorporating features of the invention.

Briefly stated, my invention contemplates the use of centrifugal force or radial acceleration as applied to a specimen or sample to be weighed, the acceleration serving to amplify or to multiply small weight differences or deviations from a prescribed weight, so that sensitivity of measurement is thereby improved. I contemplate application of such principles to a continuous production-line process, whereby a plurality of specimens may be concurrently subjected to such centrifugal forces or radial accelerations. Means may be provided for detecting radial displacements of the samples or of the sample-supporting means, and one may obtain from such displacements an indication of the extent of off-standard weight of every specimen. Means responsive to the displacements may be employed to apply restoring forces to offset the displacement. Means are described for individually picking-off the detected displacements, or for picking-off a measure of the forces required to offset the displacements, of the various sample-supporting means and for serially displaying the information thus picked-off on a single display means which may provide a permanent record. Further means may be provided for sorting-out unacceptable specimens or for adding control functions to the fabricating process in response to such automatically observed deviations from standard or prescribed sample weights.

The measurement of any variable is always subject to some degree of uncertainty. This may be caused by friction, noise, and other factors in the detecting system, and all these factors limit the accuracy obtainable. If the accuracy is to be improved, either the effective noise level must be decreased or the effective signal strength must be increased. In one particular application of my invention, specimens in the form of cigarettes weighing one gram are successively weighed at the rate of 20 per second and in the order in which they emerge from a cigarette-fabricating machine. Noise due to fabrication would be exceeding high in any conventional system which takes 20 readings per second, and my invention resides in a means for improving the accuracy of such a system by increasing the signal level. In the means characteristic of this invention, I apply radial accelerations (centrifugal forces) to cigarettes or other samples, in order to increase their apparent weight many times over the normally apparent weight, due to gravity. Increases in the effective sample weight by a factor of 10 or more may be readily obtained by the accelerating means to be described.

Referring to the drawings, my invention is shown in application to a machine having a central rotatable means in the form of a table 10, which is preferably horizontal and rotated about a vertical axis. Supported about the table 10 are a plurality of displaceable or deflectable supporting means 11 for samples to be weighed. In the form shown, each of the various supporting means 11 constitutes a beam torsionally deflectable or rockably supported at the periphery of the table 10. Each such beam may be centrally supported and include a lower or counterweight half of known weight and an upper half with means to receive the sample to be weighed. In a preferred form, the moment of the counterweight portion about the axis of beam support substantially equals and opposes the moment of the sample-supporting portion when loaded with a specimen of the desired or standard weight. Stated in other words, the moment of the counterweight portion about the axis of beam support exceeds and opposes the moment of the sample-supporting portion about the same axis by an amount substantially equal to the moment of a supported standard sample about the same axis.

Figure 2:
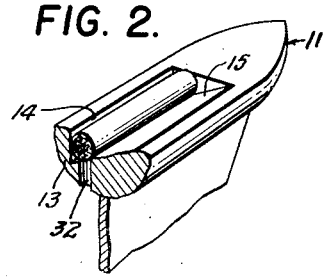
Fig. 2 is an enlarged fragmentary perspective view in partial cross-section in the plane 2—2 of Fig. 1, through one of the specimen-supporting means of the machine.

In Fig. 2, it will be seen that the upper surface or end 13 of the sample-supporting means 11 may be recessed to provide a trough for the sample; this trough may include an outer abutment wall 14 for positive radially outward location of the specimen, and an inclined wall 15. It will be clear that the described trough configuration may uniformly accommodate and support all specimens, regardless of their deviation from acceptable weight tolerances, in the desired firm abutment with the abutment wall 14.

The mounting of each beam 11 may be pivotless and involve merely a torsional member 16 to be flexed in response to the difference in centrifugal forces applied at the opposite ends 12—13 of each beam. An indication of sample weight may be obtained merely upon a determination of the deflection or angular inclination of the beam 11 in response to this difference in centrifugal forces; in such event, an angular-deflection pick-off means 17 may electrically respond to such deflections, forwarding the displacement information in electrical form to suitable indicating means, designated generally 18. However, in the form shown, I prefer to attempt restoration of each beam 11 to an erect (e. g. vertical) or to a substantially erect position, regardless of the inclination or attempted inclination of each beam 11. I, therefore, additionally provide torque-motor means 19 for applying such restoring torques as are necessary in order to establish substantially continuous erect (e. g. vertical) orientation of the beam 11, and the motor means 19 may be driven in accordance with the output of the deflection pick-off means 17.

The rotatable means 10 may be supported on a vertical spindle or shaft 20 within a generally cylindrical housing 21, in order to protect against the disturbing effects of external drafts and the like, it is preferred to provide a removable cover 22, which is shown to be of transparent material and of hemispherical shape. The recording means 18 may be located outside the cover 22 and convenient to the various manual controls 23—24 for the equipment.

In order to permit production-line adaptation of a continuously rotating and recording device as generally indicated above, I provide means for continuously successively loading the various sample-supporting means so as to subject each specimen to substantially a complete rotation about the spindle 20; automatic means may be employed for successively removing the specimen for direct supply to a packaging or other production-line machine (not shown).

Figure 3:
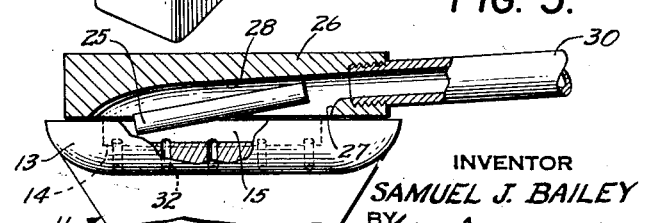
Fig. 3 is an enlarged view in partial longitudinal section of a specimen-loading means of the machine of Fig. 4.

Loading may be accomplished by a feed mechanism (not shown) utilizing pressurized air to deliver specimens 25, via a supply tube 30 to a loading head 26, in spaced relation. The supply tube 30 may pass through a part of the machine housing, but in the form shown a bossed part 31 of the cover 22 permits entry and support of tube 30 and of the loading head 26. With a proper spacing, the specimens 25 will fall in the sample pockets (14—15) of successive beams 11. The loading head 26 (see Fig. 3) may have a downwardly facing discharge-opening 27, and at the bottom of the head 26 the rim around the opening 27 may be smoothly finished so as closely to clear the correspondingly smoothly finished upper surfaces of the various sample-supporting ends 13 of beams 11. The discharge openings 27 may directly face and be aligned with the sample pockets of beams 11, and in order that samples 25 may be positively discharged into the sample pockets, the upper surfaces 28 of the discharge openings 27 may be gently curved, as shown. Free flow of loading air to the point of seating in a sample pocket may be assured by provision of vent openings 32 to the bottoms of the pockets, as will be clear. It will be appreciated that, with a proper correlation of loading speed and rotational speed, cigarettes or other samples 25 may be cleanly loaded into the sample pockets, and that, if the sample-supporting beam ends 13 are sufficiently closely adjacent (as shown), there need be no fouling of specimens even during initial set-up of the machine.

In order to remove the specimens 25 after they have been subjected to the weighing process, a removal head 29 may be employed in conjunction with a removal pipe 33, which may pass through the cover 22 for connection to a source of vacuum. The removal head 29 may be of the same general configuration as the discharge head 26, and it will be appreciated that, as each successive loaded beam 11 passes under the removal head 29, the vacuum pipe 33 may cause a flow through the passages 32 so as to forcibly eject the specimens 25 for conduct through the removal pipe 33 to the next stage of operation.

In accordance with a feature of the invention, a large number of specimens may be successively weighed, and yet a relatively substantial period of time may be devoted to the weighing of each specimen. Such substantial time is made possible by performing the weighing operation for any particular specimen during the period required for substantially a complete revolution of the table 20. During this period of time, the balancing mechanism for offsetting the various displacement tendencies of successive beams 11 may be allowed to come to equilibrium, so that, just before the instant of removing the specimens, there may be available an indication (which in the present case is in the form of an electric signal) of the exact weight, or weight-deviation from a given standard, of the specimen.

The weight-indicating signals may be capacitatively or otherwise transferred to a stationary part of the equipment for feeding to the recording means 18 or to some production-line mechanism which is to be controlled in accordance with the measured weights of the samples. In the present form, the transfer of weight information is affected inductively, as from windings 43 on the table to a winding 37 on the framework of the device.

Separate servomechanisms may be employed in conjunction with each scale beam in order to offset displacement tendencies during the weighing process and in order to generate signals which may be available for transfer to the stationary part of the machine at the transfer location. In Fig. 4, I have shown two such servomechanisms in block-diagram form; one servomechanism is mounted upon the table 10 for use in conjunction with one weighing beam 11 at one of the weighing stations 35 on the table 10, and a similar servomechanism for the next adjacent weighing station 36 is also shown. The stationary or pick-up winding 37 is preferably elongated and of effective arcuate length less than the angle subtended by one of the weighing stations. The winding 37 serves as a fixed secondary winding for inductive reception of weighing signals and is preferably located substantially immediately preceding the location of the removal head 29. The secondary winding 37 may operate the recorder means 18 in a manner to be later described.

Each servomechanism for offsetting displacement tendencies during a weighing process may include amplifier means 38 responsive to the scale pick-off signal available from the pick-off element 17. The amplified pick-off signal may be fed to the torque motor 19 in a direction to supply an offsetting or a restoring torque to the scale beam 11, and, of course, the magnitude of the signal supplied to the torque motor will be a measure of the weight or weight-deviation of the specimen. The amplifier 38 preferably includes a manual gain control 39, whereby response and sensitivity of the servomechanism may be adjusted as desired.

In order that a signal proportional to the detected weight may be effectively transferred to the recorder, I prefer that the signal be translated into a function of the total time required for sweeping a given scale-beam or weighing station past a fixed point on the equipment. For this purpose, the table 10 may additionally carry a linear-sweep generator 40 providing a sawtooth signal sweeping between upper and lower limits, once for each passage of a weighing station past the inductive pick-off winding 37. For the present case, wherein there are fifteen weighing stations on the table 10, the sweep generator 40 will make fifteen sweep cycles for each revolution of the table 10.

The output of the sweep generator 40 may be fed in parallel to each of a number of voltage comparators 41, there being a voltage comparator 41 at each weighing station. The outputs of the amplifiers 38 may also be fed to the voltage comparators 41, and, if the sweep generator 40 is adjusted to sweep through all the possible voltages appearing at the outputs of the various amplifiers 38, then the comparators 41 may yield pulse, or otherwise clearly identifiable, signals at the instant of voltage-coincidence between the swept voltage and the amplified voltage. Since the sweep-generator voltage varies linearly with each sweep and for each weighing station, the phase of the coincidence pulse with respect to the period of the sweep signal will be a measure of the specimen weight (or weight-deviation). Accordingly, the output from the voltage comparator may be suitably amplified, as at 42, and supplied to the primary transfer winding 43. Since there is but one pick-off station, as at the winding 37, and since the cycle of the sweep generator 40 is synchronized with the passage of successive weighing stations, each pulse picked up by the winding 37 may have a characteristic phase that is proportional to the weight or weight-deviation of a different specimen.

In Fig. 5, I show how the recording means 18 may be operated to utilize the pulses picked up by the winding 37. I have shown a recorder 18 of the type which utilizes a strip 44 of electrically sensitized paper and wherein a stylus is continuously swept across the paper. Means driven through reduction gearing 45 from a main motor 46 may serve to advance a feed roller 47 for the paper 44, so that the successive sweeps of the stylus across the sensitive paper 44 may be individually recorded and observed. In the form shown, the stylus is provided in triplicate, as at 48—49—50 on a continuous stylus belt. The styli 48—49—50 may be provided at equally spaced locations along the belt 51, and the spacing between styli is preferably effectively the full width of the recording paper 44. The motor 46 may directly drive the stylus belt 51 through a drive pulley 52, and the speed is such that the sweep of one stylus across the paper coincides or substantially coincides with a sweep cycle of the generator 40.

On one side of the paper 44 opposite the styli there may be a conductive backing plate 53 which in the form shown is grounded, and recording impulses may be applied, by amplifying at 54 signals picked up in windings 37, and by feeding the amplified output to the stylus belt 51, as by means of a shoe 55. The desired synchronization of the stylus writing-speed with table-rotation speed and with the sweep-generator cycle may be effected by gearing all operations to the main drive motor 46. Thus, reduction-gearing means 56 may be interposed between the motor 46 and the table spindle 29.

It will be seen that for any particular weighing station on the table 10 the servomechanism may have reached equilibrium by the time such weighing station arrives at the pick-off winding 37. By this time, the phase of the coincidence pulse generated by the comparator 41 for such station will have stabilized, so as accurately to indicate weight-deviation for the specimen under consideration. As the primary or transfer winding 43 for such weighing station becomes coupled with the pick-off winding 37, one of the styli 48—49—50 will have just begun to traverse the recorder paper 44. Such stylus for that particular traversal of the recorder paper will record exclusively for the weighing station under consideration, and there will be but one recording pulse applied to the recording paper for such traverse. If the pulse occurs in the central portion of the traversal, as between limiting brackets 57—58, a characteristic mark (as at 59) will be applied to the paper to indicate an acceptable specimen. If the pulse occurs in the early part of the sweep cycle, there will be a record (as at 60) indicative of an underweight specimen; and, if the pulse occurs in the latter part of the sweep cycle, there will be a record (as at 61) of an overweight specimen, as will be clear.

In Fig. 6, I show a modified arrangement of the invention wherein pulse signals representing underweight or overweight specimens are utilized to control a mechanism in the production line. Such mechanism happens to be a means for sorting out the unacceptable specimens from the acceptable specimens. The sorting means may be driven from the recorder itself by employment of three separate backing plates 63—64—65, in place of the single backing plate 63 of Fig. 5. The backing plates 63—64—65 may be transversely aligned beneath the stylus path, and each may include a separate circuit to ground. In the case of the ground circuit for the backing plate 63 (responsive to underweight signals), there is included a pick-off means, such as transformer means 66, to apply a signal to an amplifier 67 whenever pulses indicative of underweight specimens are received. In like manner, transformer means 68 in the ground circuit of the backing plate 65 may apply pulse signals to an amplifier 69 whenever overweight specimens are detected.

The amplifiers 67—69 may be in controlling relation with sorting and rejecting means so as to supply only acceptable specimens to suitable collector means 70, which may be a part of the production line, such as a final packaging station. In the form shown, the sorting means is purely schematically illustrated as a three-position valve or switch 71 in the line 33 from the withdrawal head 29. Opposed spring means 72—73 may normally position the sorting means 70 centrally, so that normally acceptable specimens will be passed directly to a pipe 74 to the means 70 accommodating acceptable specimens.

If an underweight specimen is detected, the amplifier 67 may apply a controlling signal to underweight-sorting means 75, which may be a solenoid acting against spring 72 to deflect the underweight specimen into a pipe line 76 to means 77 for the collection of underweight specimens. Likewise, if an overweight specimen is detected, the amplifier 69 may suitably actuate overweight-sorting means 78, which may be another solenoid acting against spring 73 to divert the overweight specimen into line 79 to suitable means 80 for the collection of overweight specimens. All three of the collector means 70—77—80 for the acceptable and for the nonacceptable specimens may be operated from the same vacuum source (schematically indicated at 81), as will be clear.

It will be seen that I have described an ingenious mechanism for automatically continuously weighing supposedly uniform specimens with high accuracy and at a rapid pace. I have shown how individual records may be made for the weighing of all specimens and how certain production-line equipment may be controlled in accordance with the detected weight or weight-deviation of successive samples. In my equipment, weight-deviations beyond certain prescribed tolerances are substantially immediately apparent, and appropriate corrective measures may therefore be taken with a minimum loss of material and time. My mechanism may be adapted to a high-speed production-line process without in any way impairing the speed of such process.

While I have described my invention in detail for the preferred forms shown, it will be understood that modifications may be made within the scope of the invention as defined in the appended claims.

I claim:

1. In a weight-measuring device of the character indicated, means for supporting a sample to be weighed, means for rotating said supporting means at a radial distance from a rotary axis, force-measuring means electrically responsive to centrifugal force on said supporting means for measuring said centrifugal force, whereby from a knowledge of the speed of rotation and of the measured centrifugal force the weight of the sample may be determined, and stationary electrical pick-off means responsive to the output of said force-measuring means.

2. In a weight-measuring device of the character indicated, supporting means for a sample to be weighed, means for rotating said supporting means at a radial distance from a rotary axis, said supporting means being displaceably mounted relatively to said axis, whereby upon rotation said supporting means may be displaced under the influence of centrifugal force, force-measuring means responsive to such displacement, and displacement-restoring means proportionally responsive to said force-measuring means and including means tending to restore said displacement to said supporting means, whereby the weight of the sample may be determined from a knowledge of the energy required to operate said displacement restoring means.

3. In a weight-measuring device of the character indicated, rotatable means including means offset from the rotary axis thereof for generally radially movably supporting a sample to be weighed, displacement-responsive means responsive to a generally radial displacement of the sample, and displacement-restoring means proportionally controlled by said responsive means and tending to offset generally radial displacements of the sample.

4. In a weight-measuring device of the character indicated, rotatable means, supporting means for a sample to be weighed and carried by said rotatable means, said supporting means being centrifugally deflectably mounted at a location radially offset from the rotary axis of said rotatable means, displacement-responsive means responsive to centrifugal deflections of said supporting means, and position-restoring means for repositioning said supporting means in a direction offsetting said deflection, said position-restoring means being proportionally responsive to said displacement-responsive means, whereby the energy required to operate said restoring means may provide an indication of the weight of the sample.

5. In a weight-measuring device of the character indicated, rotatable means, a beam rockingly supported on said rotatable means at a location offset from the rotary axis thereof, said beam being positioned generally parallel to the rotary axis and being rockable generally about an axis generally tangentially disposed relatively to the rotary axis, sample-supporting means carried by said beam at a location spaced from the rocking axis of said beam, and position-restoring means responsive to a rocking displacement of said beam and connected to drive said beam about the rocking axis in a direction to offset such displacement.

6. In a device of the character indicated, a beam rockable about a rocking axis, sample-supporting means carried by said beam at one end thereof, calibrated mass-supporting means carried at the other end of said beam, and means for rotating said rocking axis through a radial plane including the rocking axis, the rotary axis being generally parallel to the orientation of said beam, whereby the radially inward or radially outward observed deflection of said beam may indicate the weight deviation of the sample with respect to the calibrated mass.

7. In a weight-measuring device of the character indicated, a generally vertically disposed beam rockable about a generally horizontal axis, supporting means on said beam at one side of the axis of said beam for supporting a sample of unknown weight, means on said beam on the other side of the axis of said beam for supporting a known weight, means for supporting the axis of said beam for rotation about a generally vertical rotary axis at a location radially offset from said generally vertical rotary axis, means responsive to centrifugal deflections of said beam about said rocking axis, and indicating means responsive to said displacement responsive means.

8. In a weight-measuring device of the character indicated, rotatable means, generally radially displaceable supporting means for a sample of unknown weight, said supporting means being carried by said rotatable means and located at a point radially offset from the axis of said rotatable means, displacement-responsive means responsive to displacements of said supporting means due to centrifugal force, and displacement-restoring means controlled by said displacement-responsive means and connected to oppose a centrifugal displacement of said supporting means.

9. In a weight-measuring device of the character indicated, rotatable means including drive means therefor, generally radially displaceable supporting means for a sample of unknown weight, said supporting means being carried by said rotatable means and located at a point radially offset from the axis of said rotatable means, means responsive to centrifugal force acting on said supporting means and connected to oppose a centrifugal displacement of said supporting means, said displacement-responsive means including means generating a voltage indicative of displacement, sweep-generator means operated at a sweep frequency in synchronism with said drive means and sweeping a range of voltages including at least the voltage expected to result from such displacement, and means responsive to a coincidence of the outputs of said sweep-voltage means and of said displacement-responsive means.

10. A device according to claim 9, including weight-indicating means responsive to said last-defined means, said weight-indicating means including scanning means operating in synchronism with the sweep of said sweep-generator means.

11. A device according to claim 10, in which sorting means are provided to separate specimens exceeding a given weight from those under said given weight, said sorting means being responsive to said last-defined means and including a sweep mechanism operated in synchronism with the sweep of said sweep-generator means.

12. In a weight-measuring device of the character indicated, a plurality of generally radially displaceable supporting means for samples to be individually weighed, said supporting means being disposed in circumferentially spaced relation about a rotary axis, whereby all said rotating means may be rotated in unison about said axis, displacement-responsive means responsive to centrifugal displacement of each of said supporting means, displacement-restoring means responsive to said displacement-responsive means and tending to restore displacement of each said supporting means in a direction offsetting centrifugal displacement thereof, and recording means for recording individually the energy required to operate each said displacement-restoring means.

13. A device according to claim 12, in which said supporting means are rotated continuously and in which automatic loading and unloading means for samples are provided, whereby a continuous succession of samples may be continuously individually weighed.

14. A device according to claim 13, in which said automatic loading means includes a pressurized tube disposed to load samples on said supporting means, and in which said unloading means includes a tube subjected to a reduced pressure and disposed generally in the path of said supporting means, whereby samples may be removed by partial vacuum in said second-mentioned tube.

15. In a weight-measuring device of the character indicated, rotatable means rotatable about a generally vertical axis, a plurality of circumferentially spaced sample-supporting means located at the same radial distance from said axis and tiltably supported about axes generally tangential to their orbit when rotating about said generally vertical axis, each of said sample-supporting means including energy-generating displacement-responsive means tending to offset a tilting of each said sample-supporting means under the action of centrifugal force, and indicating means responsive to tilt under the action of centrifugal force, said indicating means including a single indicator with marker means swept at the rotary frequency of said rotatable means times the number of sample-supporting means, and relatively fixed energy pick-off means in energy-transferring relation with the displacement-responsive means of each of said sample-supporting means, said pick-off means being effective for an arcuate extent not exceeding 360° divided by the number of sample-supporting means carried by said rotatable means, whereby in a high-speed weight-measuring operation each of said sample-supporting means may be allowed substantially a complete revolution of said rotatable means in which to come to equilibrium, and whereby the equilibrium condition may determine the data transferred to said indicating means via said pick-off means.

16. In a centrifugal weighing machine of the character indicated, rotary-support means on a generally vertical axis of rotation, a tiltable beam mounted offset from said generally vertical rotary axis and on a tilt axis generally tangentially disposed relative to said generally vertical axis, comprising a generally upstanding member with pivotal-support means intermediate the ends thereof, sample-supporting means at the upper end of said beam, and counterweight means at the lower end of said beam, the moment of said counterweight means about the pivotal axis exceeding and opposing the moment of said sample-supporting means about said axis by an amount substantially equal to the moment of a given sample supported in said sample-supporting means about said axis.

17. A device according to claim 16, in which said sample-supporting means has an upwardly facing sample-receiving recess, the outer wall of said recess about the rotary axis being generally upstanding and the inner wall being sloped toward the rotary axis, whereby all samples received in said opening will be held at a substantially fixed radius against said upstanding wall.

18. In a centrifugal weighing machine of the character indicated, a generally upstanding beam with means for the pivotal support thereof about a generally horizontal axis, sample-supporting means offset from said axis and on said beam, torsional-suspension means about said axis, rotary-support means on a generally vertical axis of rotation and supporting said beam with the tilt axis thereof generally tangentially disposed relative to said generally vertical axis, and deflection restoring means responsive to deflection of said torsional-suspension means.

19. In an automatic weighing machine of the character indicated, a frame, a turntable supported by said frame for rotation about a vertical axis, sample-supporting means movably mounted on said turntable at a point radially displaced from the axis of rotation of said turntable, said sample-supporting means including means electrically responsive to centrifugal action on said sample when subjected to rotation of said turntable, amplifier means for said electrically responsive means, all electrical components being carried on said turntable, whereby only relatively simple power-supply slip-ring connections need be made between said frame and said turntable.

20. A device according to claim 19, including stationary indicator means, and inductive coupling means between electrical components on said turntable and said last-defined means.

21. In a weight measuring device of the character indicated, a beam having a tilt axis and including a sample-supporting portion and a counterweight portion at opposite sides of said axis, rotary-support means for said beam and supporting said beam with its tilt axis at a radial distance from the rotary axis of said support means, said counterweight portion and said sample-supporting portion being substantially equally spaced from said rotary axis, and force-measuring means responsive to a tilt of said beam under the action of centrifugal force.

SAMUEL J. BAILEY.

REFERENCES CITED

The following references are of record in the file of this patent:

UNITED STATES PATENTS

| Number | Name | Date |
|---|---|---|
| 2,305,783 | Heymann et al. | Dec. 22, 1942 |
| 2,319,940 | Harrison | May 25, 1943 |

FOREIGN PATENTS

| Number | Country | Date |
|---|---|---|
| 3,353 | Australia | Aug. 4, 1932 |